(12) United States Patent
Dubey

(10) Patent No.: US 6,637,021 B1
(45) Date of Patent: Oct. 21, 2003

(54) JAVABEAN ACTIVATION FRAMEWORK-COMMON DESKTOP ENVIRONMENT BRIDGE

(75) Inventor: Nidheesh Dubey, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/343,964

(22) Filed: Jun. 30, 1999

(51) Int. Cl.$^7$ ................................................ G06F 9/44
(52) U.S. Cl. ........................ 717/108; 717/116; 717/121
(58) Field of Search ................................. 717/100, 108, 717/116, 118, 127, 148, 165, 110, 149; 707/203, 511

(56) References Cited

U.S. PATENT DOCUMENTS

| | | | | | |
|---|---|---|---|---|---|
| 5,724,595 | A | * | 3/1998 | Gentner | 707/501 |
| 5,832,505 | A | * | 11/1998 | Kasso et al. | 707/104 |
| 6,085,198 | A | * | 7/2000 | Skinner et al. | 707/103 |
| 6,115,719 | A | * | 9/2000 | Purdy et al. | 707/103 |
| 6,151,700 | A | * | 11/2000 | Fox | 717/107 |
| 6,170,015 | B1 | * | 1/2001 | Lavian | 709/232 |
| 6,175,868 | B1 | * | 1/2001 | Lavian et al. | 709/223 |
| 6,185,730 | B1 | * | 2/2001 | LeBlanc | 717/108 |
| 6,209,125 | B1 | * | 3/2001 | Hamilton et al. | 717/125 |
| 6,236,909 | B1 | * | 5/2001 | Colson et al. | 701/1 |
| 6,237,135 | B1 | * | 5/2001 | Timbol | 717/107 |
| 6,239,798 | B1 | * | 5/2001 | Ludolph et al. | 345/788 |
| 6,247,020 | B1 | * | 6/2001 | Minard | 707/104 |
| 6,298,475 | B1 | * | 10/2001 | Alcorn | 717/118 |
| 6,330,711 | B1 | * | 12/2001 | Knutson | 717/100 |
| 6,336,118 | B1 | * | 1/2002 | Hammond | 707/103 |
| 6,339,826 | B2 | * | 1/2002 | Hayes, Jr. et al. | 713/166 |
| 6,341,314 | B1 | * | 1/2002 | Doganata et al. | 709/224 |
| 6,438,217 | B1 | * | 8/2002 | Huna | 379/88 |
| 6,438,744 | B2 | * | 8/2002 | Toutonghi et al. | 717/137 |

FOREIGN PATENT DOCUMENTS

| US | WO 02/05086 A2 | * | 1/2002 | ............ G06F/9/00 |
|---|---|---|---|---|

OTHER PUBLICATIONS

Marsic et al, "An application for synchronous collaboration using Java Beans", IEEE, pp. 1–10, Mar. 1999.*

Sawhney et al, "Java Beans based framework for construction simulation", ACM Proc. 2000 winter simulation conf. pp. 1919–1925.*

White, "Enterprise Javabeans architecture and design issue", IEEE, pp. 731–732, Jul. 2001.*

Tscheligi et al, "Java based user interface design and development", ACM CHI, pp. 115–116, Apr. 1998.*

Li et al, "Collaboration transparency in the DISCIPLE framework", ACM GROUP, pp. 326–335, Jan. 1999.*

JavaBeans API Specification, Version 1.01, Sun Microsystems (1997).

Lieberman, Henry, *Using Prototypical Objects to Implement Shared Behavior in Object Oriented Systems*, OOPSLA 86 Proceedings, Sep. 1986, pp. 214–223.

\* cited by examiner

*Primary Examiner*—Anil Khatri
(74) *Attorney, Agent, or Firm*—O'Melveny & Myers LLP

(57) ABSTRACT

One or more embodiments of the invention provide Common Desktop Environment (CDE) applications with the ability to utilize JavaBeans components and applications written in the Java programming language. Such an embodiment provides for the use of a virtual machine that maintains the ability to execute and return results from applications written in the Java programming language. Similarly, one or more embodiments of the invention provide applications written in the Java programming language with the ability to utilize CDE applications. In one or more such embodiments, a module (referred to as a CDEBean) launches a generic application to perform the datatyping and launch of CDE applications. Since a CDEBean is a JavaBeans component, the use of a CDE application is transparent to the application itself. Consequently, one or more embodiments provide for the transparent use of CDE applications in an application written in the Java programming language.

14 Claims, 5 Drawing Sheets

JAVABEAN ACTIVATION FRAMEWORK-COMMON DESKTOP ENVIRONMENT BRIDGE

BACKGROUND OF THE INVENTION

1. Field of the Invention

This invention relates to the field of computer software, and, more specifically, to the use of computer software across multiple platforms in varying environments.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Software developers may create and write computer code such that the code can be used and reused in a variety of different applications. Code that is written in such a format may be referred to as a module or bean. For example, a module may be written that provides the ability to view a word processing document. Other applications can then insert or utilize the pre-programmed module to view a word processing document as part of the application. However, depending on the environment that a developer/user is utilizing the module may not be compatible or execute properly. For example, a developer using a particular type of graphical user interface may not be able to execute or utilize modules written in a programming language that the graphical user interface does not understand. A method for bridging the gap between the module and the graphical user interface is needed and useful.

To provide a better understanding of the prior art, a description of object oriented programming, programming languages, modules and environments is useful.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data.

An object can be instructed to perform one of its methods when it receives a "message." One advantage of object-oriented programming is the way in which methods are invoked. When a message is sent to an object, it is not necessary for the message to instruct the object how to perform a certain method. It is only necessary to request that the object execute the method.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, Sep. 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

Programming Languages

Applications may be written in a variety of programming languages including FORTRAN, Pascal, Assembly Language, C, C++, Ada, LISP, Small Talk, Visual Basic, or the Java ™ programming language.

As described above, in an object-oriented programming language, each program may be comprised of one or more object classes. Classes in such a programming language may be compiled into machine independent bytecode class files. Each class contains code and data in a platform-independent format called the class file format. The computer system acting as the execution vehicle supports the runtime environment (e.g., a Java™ runtime environment if the Java programming language is utilized). The runtime environment contains a program called a virtual machine, which is responsible for executing the code in classes.

Applications may be designed as standalone applications, or as "applets" which may be identified by an applet tag in an HTML document, and loaded by a browser application. The class files associated with an application or applet may be stored on the local computing system, or on a server accessible over a network. Each class is loaded into the runtime environment, as needed, by the "class loader."

Classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Modules

Classes may be incorporated into components referred to as modules or JavaBeans ™ components. Components or modules may be easily used in multiple applications merely by inserting the module in the code for the desired application. For example, a module that provides a viewer for viewing a word processing document or a PDF (portable document format) document may be inserted in a word processing application that provides the ability to edit and spell check a document. Similarly a module for editing a document in a specific format (e.g., HTML or PDF) may be inserted in an application that provides additional capabilities or services. Additionally, a module for viewing a spreadsheet document or a document in the form of a presentation may be inserted in an application that provides further abilities.

JavaBeans components are designed in accordance with the JavaBeans API Specification to allow for component-based application building. Bridges (e.g., ActiveX bridges) may be used with JavaBeans components to allow JavaBeans components to be used in other component model environments, such as OLE/COM and CORBA. For example, a JavaBeans Bridge for ActiveX enables developers using ActiveX and COM objects to embed JavaBeans in their ActiveX or COM code.

Support for features such as "introspection," "customization," "events," "properties" and "persistence" is provided within the JavaBeans framework to facilitate application building and component use. "Introspection" permits builder tools to analyze how a particular bean works. "Customization" permits an application builder to customize the appearance and behavior of a bean. "Events" provide a simple communication metaphor that can be used to connect a bean with other application components or beans. "Properties" are used for bean customization and programmatic use. "Persistence" allows for a bean to have its customized state saved and reloaded later. These features are discussed in the JavaBeans API Specification, Version 1.01, by Sun Microsystems (1997), which is available on the World Wide Web, and is incorporated herein by reference.

The prior art (e.g., the JavaBeans Activation Framework (JAF))provides the ability to utilize a standard service to determine the type of an arbitrary piece of data, encapsulate access to it, discover the operations available on it, and to instantiate the appropriate module to perform the desired operation(s). For example, if a browser obtained a JPEG image, the browser is enabled to identify the stream of data as a JPEG image, and from that type, the browser could locate and instantiate an object/module that could manipulate or view that image.

Environments

An environment is a particular configuration of hardware or software. Thus, many different configurations and environments may be utilized in a computer system. Some examples of configurations/environments are the Solaris, UNIX, and Windows '98 operating systems. Each operating system may present and display information to a user in a different format.

One type of environment used is the Common Desktop Environment (CDE). The CDE is a particular graphical user interface (the graphical display of information to a user on a computer desktop). Implementations of CDE include look-and-feel, window management, messaging services in the desktop, and command and programming interfaces for windowing. CDE may provide numerous capabilities such as the ability to view postscript files, the ability to use a pc (personal computer) proxy to launch an application in a pc, and the ability to view a pc type of document on a Solaris or Sparc. Such capabilities could be useful in alternative environments if they could be executed in the alternative environments.

SUMMARY OF THE INVENTION

One or more embodiments of the invention provide CDE applications with the ability to utilize JavaBeans components and applications written in the Java programming language. Such an embodiment provides for the use of a virtual machine that maintains the ability to execute and return results from applications written in the Java programming language.

Similarly, one or more embodiments of the invention provide applications written in the Java programming language with the ability to utilize CDE applications. In one or more such embodiments, a module (referred to as a CDEBean) launches a generic application to perform the datatyping and launch of CDE applications. Since a CDEBean is a JavaBeans component, the use of a CDE application is transparent to the application itself. Consequently, one or more embodiments provide for the transparent use of CDE applications in an application written in the Java programming language.

DETAILED DESCRIPTION OF THE INVENTION

The invention is a JavaBean Activation Framework (JAF)—Common Desktop Environment (CDE) bridge. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
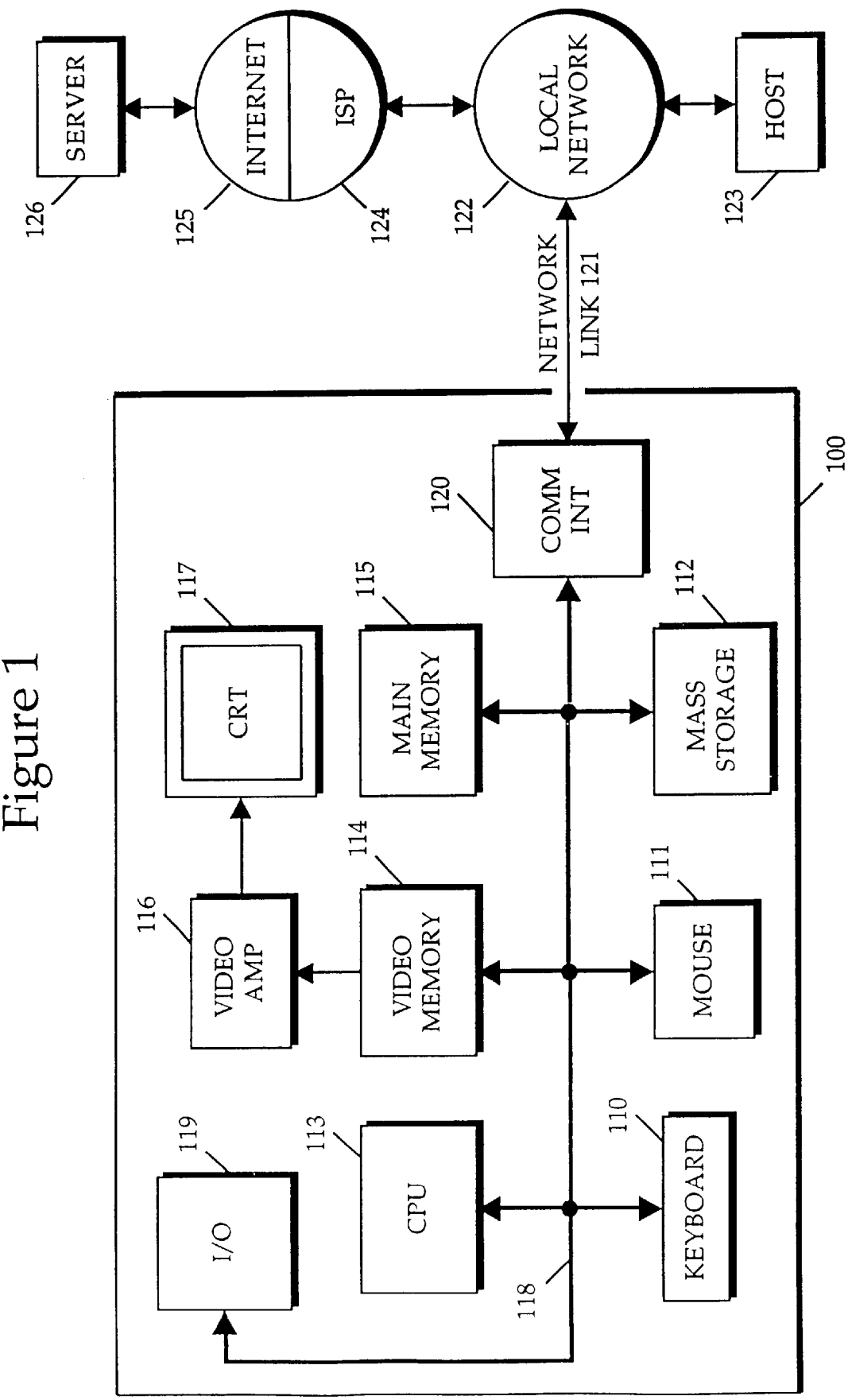
FIG. 1 is a block diagram of one embodiment of a computer system capable of providing a suitable execution environment for one or more embodiments of the invention.

An embodiment of the invention can be implemented as computer software in the form of computer readable code executed on a general purpose computer such as computer 100 illustrated in FIG. 1, or in the form of bytecode class files executable within a Java runtime environment running on such a computer, or in the form of bytecodes running on a processor (or devices enabled to process bytecodes) existing in a distributed environment (e.g., one or more processors on a network). A keyboard 110 and mouse 111 are coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, are coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC ™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

Various applications that provide for the JAF-CDE bridge according to one or more embodiments of the invention may contain multiple related functions and data structures. One embodiment of the invention utilizes a standard object oriented programming (OOP) language as described above to write and encapsulate an application's transactions, functions, and data structures.

Implementation in a Variety of Programming Language

The description, examples, and implementations described below may refer to or utilize a variety of programming languages. However, the invention is not limited to the use of any mentioned programming language and may be implemented in any type of programming language. For example, embodiments of the invention may be implemented in any type of programming language (object oriented or otherwise) including but not limited to programming languages such as FORTRAN, Pascal, Assembly Language, C, C++, Ada, LISP, Small Talk, Visual Basic, or the Java programming language.

One or more embodiments of the invention utilize an object-oriented programming language with each program comprising one or more object classes. Further, one or more embodiments of the invention may utilize JavaBeans components as described above.

IAF Aware JavaBeans Components

One or more embodiments of the invention utilize and leverage support for the invention utilizing JAF aware JavaBeans components. JAF aware JavaBeans components implement an interface (as described above) that finds out which method/operation the JavaBean component is being asked to perform and obtains the object that contains/represents the data the operation is going to be performed on. For example, suppose a word processing document is given to a JAF aware JavaBeans component. The component implements an interface that determines that the component is being asked to perform a "view" or "read" operation whenever it is passed a word processing document. Based on this determination, the component can obtain and instantiate an object that has the ability to view or manipulate the document.

Implementation of Software Apparatus for the IAF-CDE Bridge

One or more embodiments of the invention provide CDE applications with the ability to utilize JavaBeans components and applications written in the Java programming language. Similarly, one or more embodiments of the invention provide applications written in the Java programming language with the ability to utilize CDE applications. To accomplish these tasks, one or more embodiments of the invention establishes a bridge between JAF aware JavaBeans components and CDE.

CDEBean Implementation

One or more embodiments of the invention provide for a module that allows applications written in the Java programming language to utilize CDE applications. In one or more embodiments, a module (referred to as a CDEBean) launches a generic application to perform the datatyping (the classification of files as a particular type including but not limited to a postscript file, a pdf document, a word processing document, a spreadsheet file, or a Solaris executable, for example) and launch of CDE applications. To applications written in the Java programming language, the CDEBean appears to be another application written in the Java programming language. Consequently, by utilizing a module to activate and launch CDE applications, applications written in the Java programming language may utilize CDE applications.

In one or more embodiments, JAF based JavaBeans components understand and utilize data typing similar to CDE's data typing. For example, the JAF may rely on a mailcap/mimetype type of file to define the data type and various commands that can be performed on the data type. Mailcap is used to define a CommandMap for all mime types defined in a system. Consequently, a JavaBeans component knows what operations can be performed on the data type using the CommandMap object. In such an embodiment, the CDEBean may be utilized for mapping CDE applications such as a postscript viewer using sdtimage. In one or more such embodiments, the CDEBean contains a META-INF/mime_type and META-INF/mailcap to enable JAF compliant applications to use CDE services/applications for file types such as postscript, vcard, etc. In one or more embodiments, a Solaris executable (referred to as a sdtaddbean) is utilized to generate a ".dt" file that describes the data attribute and data criteria for a bean. The sdtaddbean will read the META-INF/mime_type and META-INF/mailcap entries from a JavaBeans component and generate a ".dt" file from a JavaBeans component's JAR (Java archive) file (a package containing related class files and resources that a particular application may utilize). The ".dt" file may then be utilized by other CDE applications to determine the type of commands and data types that may be handled.

Figure 2:
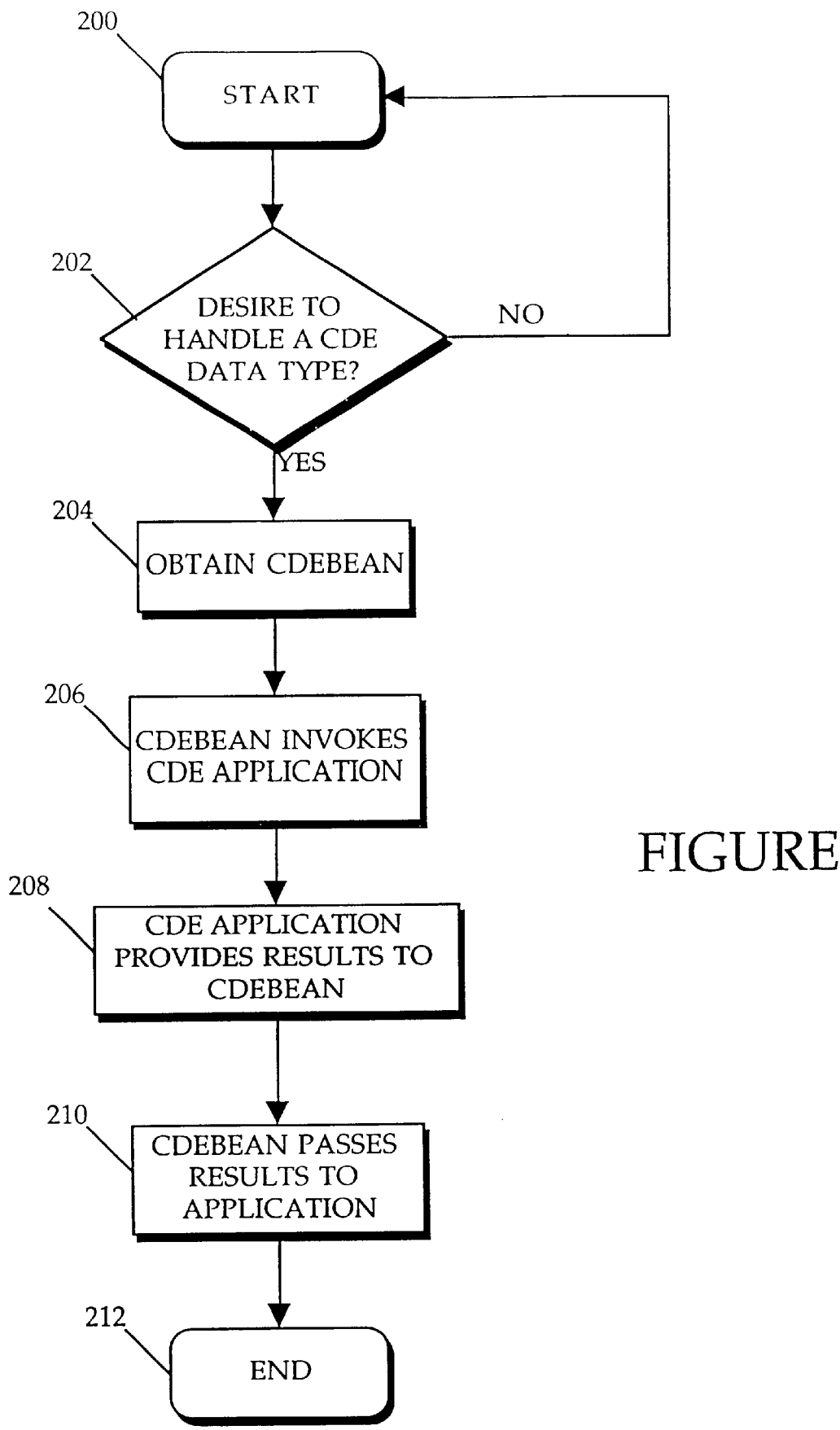
FIG. 2 is a flow diagram that illustrates the use of a CDEBean in accordance with one or more embodiments of the invention.

FIG. 2 is a flow diagram that illustrates the use of a CDEBean in accordance with one or more embodiments of the invention. The process starts at step 200. At step 202, a determination is made regarding whether the user/developer/application desires to handle a CDE data type. If a CDE data type is not going to be utilized, program execution continues as normal. If there is a desire to utilize a CDE data type, a CDEBean is obtained at step 204. As described above, in one or more embodiments, the application may reference the ".dt" file to determine which CDE data types (e.g., the commands necessary and data types supported) may be handled. At step 206, the CDEBean invokes the desired CDE application. At step 208, the CDE application provides the results to the CDEBean. At step 210, the CDEBean passes the results to the application that issued the CDE application call (e.g., the application that desired to use the CDE application). The process is complete at step 212, where execution may continue.

Figure 3:
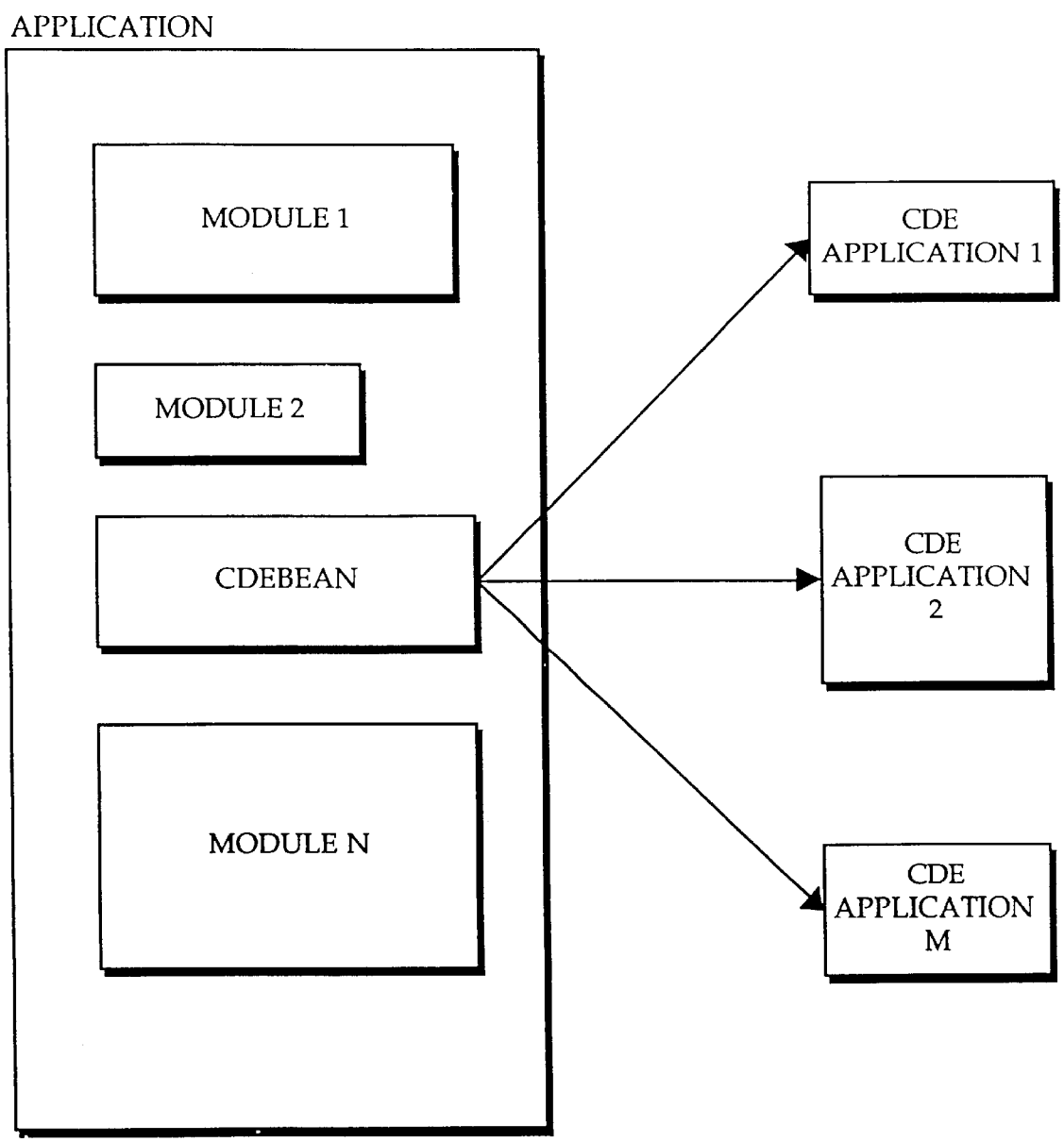
FIG. 3 illustrates the interaction between an application and the CDE environment in accordance with one or more embodiments of the invention.

FIG. 3 illustrates the interaction between an application and the CDE environment in accordance with one or more embodiments of the invention. The application may consist of one or more modules (e.g., module 1, module 2, ... module N). One such module is the CDEBean. If the application utilizes any CDE applications (e.g., CDE Application 1, CDE Application 2, ..., CDE Application M), they are processed through the CDEBean. Since the CDEBean controls all interaction between the CDE environment and the application, the use of CDE applications is transparent to the application and other modules (e.g., modules 1-N). Accordingly, applications written in the Java programming language may utilize CDE applications transparently.

In accordance with the above description, to utilize a CDE application such as an application to view a word processing, PDF, or spreadsheet document, the application merely needs to instantiate a CDEBean that has the ability to interact with and communicate with the CDE application that controls the desired viewing capability. Thus, the CDE application appears to the module/JavaBean component that utilizes the CDE application as another module/JavaBeans component and not as a CDE application.

Virtual Machine Implementation

One or more embodiments of the invention provide for an application that allows CDE applications to utilize applications or modules written in the Java programming language. In such an embodiment, the application or module written in the Java programming language maintains the ability to instantiate JavaBeans components so that the CDE application can utilize a particular JavaBeans component.

Figure 4:
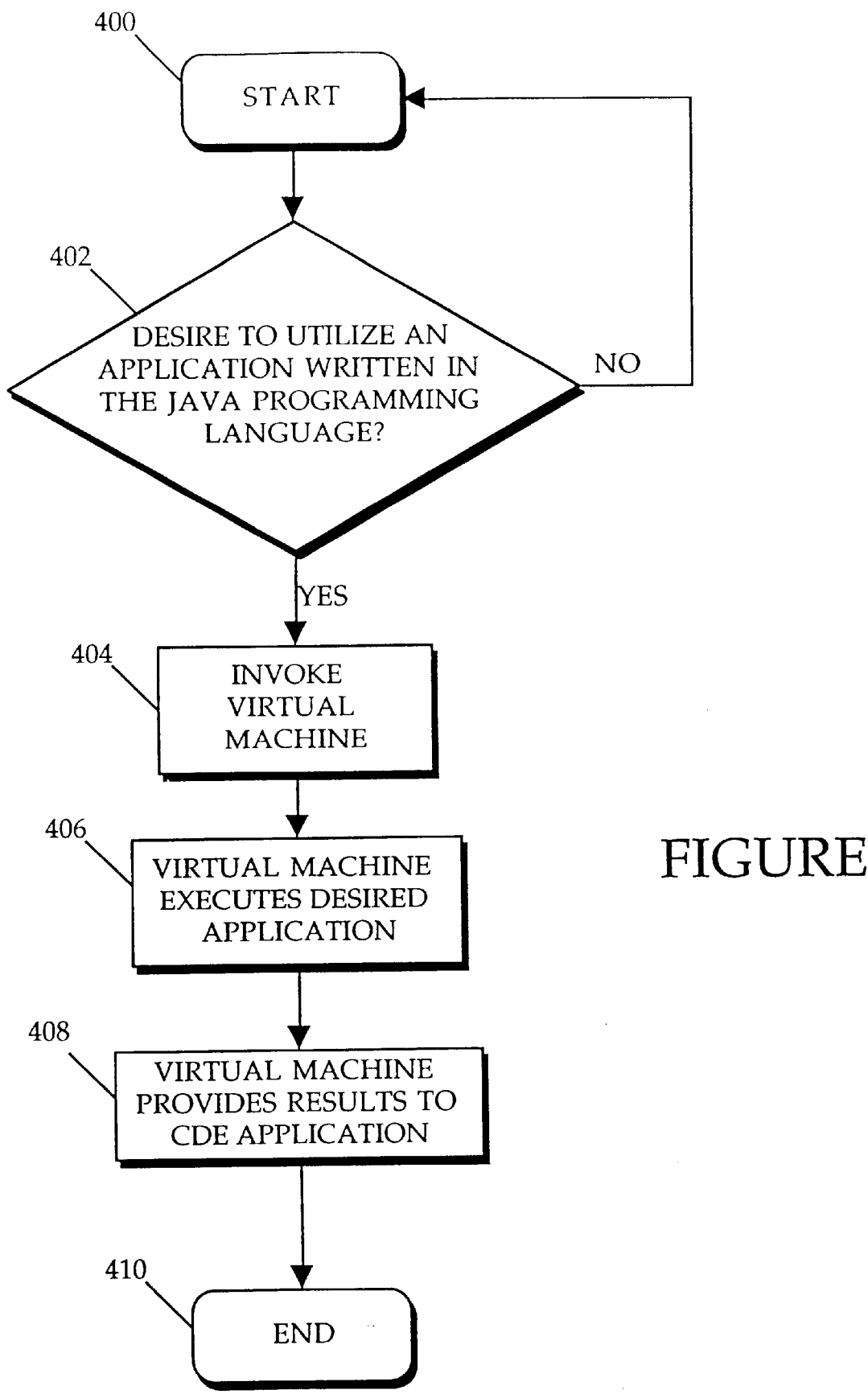
FIG. 4 is a flow chart illustrating the use of a virtual machine in accordance with one or more embodiments of the invention.

FIG. 4 is a flow chart illustrating the use of a virtual machine in accordance with one or more embodiments of the invention. The process begins at step 400. At step 402, a determination is made as to whether the application/user/developer desires to utilize an application written in the Java programming language. If no application written in the Java programming language is going to be utilized, processing may continue as normal. If an application written in the Java programming language is going to be utilized, a virtual machine (capable of executing programs written in the Java programming language) is invoked at step 404. At step 406, the virtual machine executes the desired application. At step 408, the virtual machine provides the results of the application to the CDE application, that desired to utilize the application written in the Java programming language. The process is complete at step 410.

Figure 5:
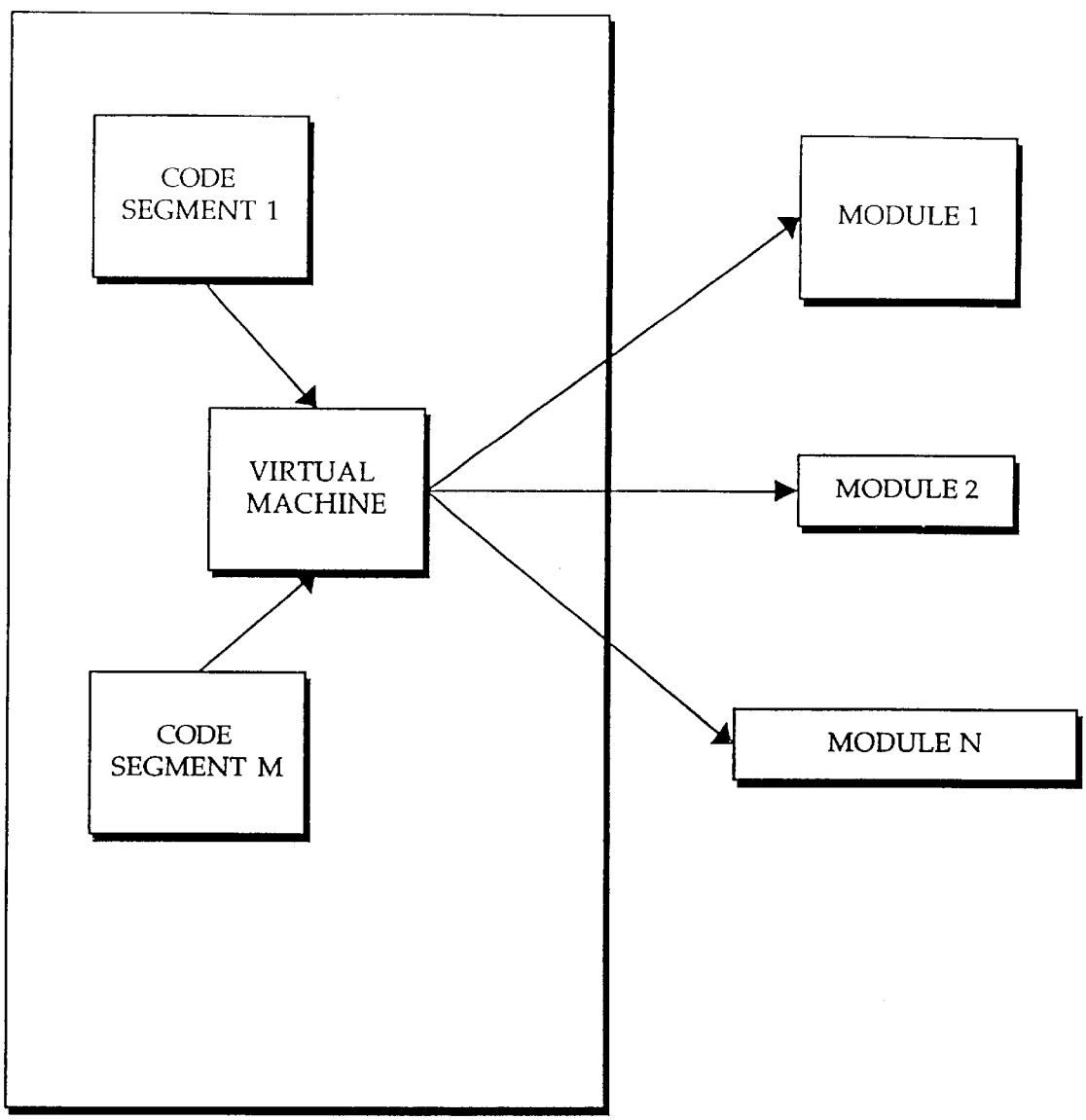
FIG. 5 illustrates the interaction between a CDE Application and a program written in the Java programming language in accordance with one or more embodiments of the invention.

FIG. 5 illustrates the interaction between a CDE Application and a program written in the Java programming language in accordance with one or more embodiments of the invention. A CDE Application may contain various code segments (e.g., code segment 1, ..., code segment M). Further each code segment may interact with the virtual machine. When a CDE application desires to utilize or leverage off of an application, module, or JavaBean component, a call is made to the virtual machine. The virtual machine is executed in the CDE environment and maintains the ability to communicate with CDE applications. Further, the virtual machine maintains the capability to execute programs (e.g., modules or JavaBeans components) written in the Java programming language (e.g., Module 1, Module 2, ..., Module N). Thus, the Virtual Machine executes the desired application and returns the results to the CDE code segment/application.

Thus, a JAF-CDE Bridge is described in conjunction with one or more specific embodiments. The invention is defined by the claims and their full scope of equivalents.

What is claimed is:

1. A method of utilizing a Common Desktop Environment (CDE) application while in an application written in a Java programming language that results in transforming said application written in the Java programming language with an ability to utilize a CDE data type, said method comprising:

determining if a CDE data type is to be handled in said application written in the Java programming language;

obtaining a JavaBean Activation Framework (JAF) JavaBeans component for interfacing said application written in the Java programming language with a CDE application for said CDE data type if said CDE data type is to be handled; and utilizing said JAF JavaBeans component to invoke said CDE application for said CDE data type.

2. The method of claim 1 wherein said CDE application is an application to view a file that is a particular format.

3. The method of claim 1 wherein said JAF JavaBeans component is capable of launching a generic application to perform a datatyping and launching of CDE applications.

4. A method of utilizing a program written in the Java programming language while in a Common Desktop Environment (CDE) application that results in transforming said CDE application with an ability to utilize an application written in the Java programming language, said method comprising:

determining if JavaBean Activation Framework (JAF) JavaBeans component written in the Java programming language is to be utilized;

obtaining a virtual machine that can be executed while in said CDE application if said JAF JavaBeans component written in the Java programming language is to be utilized, said virtual machine capable of executing JAF JavaBeans components written in the Java programming language; and executing said JAF JavaBeans component written in the Java programming language in said virtual machine.

5. The method of claim 4 wherein said obtaining step comprises obtaining a currently executing virtual machine.

6. The method of claim 4 wherein said obtaining step comprises invoking a virtual machine.

7. A system configured to result In transforming an application written in the Java programming language with an ability to utilize a Common Desktop Environment (CDE) application, said system comprising:

a CDE application;

a JavaBean Activation Framework (JAF) JavaBeans component configured to execute said CDE application, wherein said JAF JavaBeans component is further configured to be executable by said application written in the Java programming language; and said application written in the Java programming language calling and executing said JAF JavaBeans component.

8. The system of claim 7 wherein said CDE application is configured to view a file that is a particular format.

9. The system of claim 7 wherein said JAF JavaBeans component is configured to launch a generic application to perform datatyping and launching of CDE applications.

10. A system configured to result in transforming a Common Desktop Environment application (CDE) with an ability to utilize an application written in Java programming language, said system comprising:

JavaBean Activation Framework (JAF) JavaBeans component written in the Java programming language;

a virtual machine configured to execute said JAF JavaBeans component written in the Java programming language, wherein said virtual machine is further configured to be executable by said CDE application; and said CDE application configured to utilize said virtual machine to execute said JAF JavaBeans component written in the Java programming language.

11. A computer program product comprising:

a computer usable medium having computer readable program code written in Java programming language embodied therein configured to utilize a Common Desktop Environment (CDE) application that results in transforming said medium with an ability to utilize a CDE data type, said computer readable program code comprising:

computer readable program code configured to cause a computer to determine if a CDE data type is to be handled by said computer readable program code;

computer readable program code configured to cause a computer to obtain a JavaBean Activation Framework (JAF) JavaBeans component for interfacing said medium with a CDE application for said CDE data type if said CDE data type is to be handled; and computer readable program code configured to cause a computer to utilize said JAF JavaBeans component to invoke said CDE application for said CDE data type.

12. The computer program product of claim 11 wherein said CDE application is an application to view a file that is a particular format.

13. The computer program product of claim 11 wherein said JAF JavaBeans component is configured to launch a generic application to perform datatyping and launching of CDE applications.

14. A computer program product comprising:

a computer usable medium having Computer Desktop Environment (CDE) computer readable program code embodied therein configured to result in transforming said medium with an ability to utilize an application written in the Java programming language, said CDE computer readable program code comprising:

computer readable program code configured to cause a computer to determine if JavaBean Activation Framework (JAF) JavaBeans component written in the Java programming language is to be utilized;

computer readable program code configured to cause a computer to obtain a virtual machine that can be executed while in said medium if said JAF JavaBeans component written in the Java programming language is to be utilized, said virtual machine configured to execute JAF JavaBeans components written in the Java programming language; and computer readable program code configured to cause a computer to execute said JAF JavaBeans component written in the Java programming in said virtual machine.

* * * * *